(12) United States Patent
Kosuru et al.

(10) Patent No.: US 8,977,295 B2
(45) Date of Patent: Mar. 10, 2015

(54) METHOD AND APPARATUS FOR GENERATING REAL-TIME MAP AND LOCATION-BASED DATA

(75) Inventors: Yekesa Kosuru, Westford, MA (US); Boris Lublinsky, Naperville, IL (US); Rajiv Synghal, Concord, CA (US); Alexey Yakubovich, Buffalo Grove, IL (US)

(73) Assignee: Here Global B.V., Veldhoven (NL)

( * ) Notice: Subject to any disclaimer, the term of this patent is extended or adjusted under 35 U.S.C. 154(b) by 0 days.

(21) Appl. No.: 13/314,256

(22) Filed: Dec. 8, 2011

(65) Prior Publication Data

US 2013/0150087 A1     Jun. 13, 2013

(51) Int. Cl.
*H04W 72/00* (2009.01)
*H04W 4/02* (2009.01)

(52) U.S. Cl.
CPC ............... *H04W 4/02* (2013.01); *H04W 4/021* (2013.01)
USPC ...................... 455/456.3; 455/456.1; 455/424; 455/418; 455/435.1; 455/452.2

(58) Field of Classification Search
CPC ....... H04W 4/02; H04W 4/021; H04W 4/025; H04W 4/023; H04W 8/08; H04W 48/04; H04W 64/00; H04L 29/08657
USPC ................ 455/456.3, 456.1, 424, 418, 435.1, 455/452.2
See application file for complete search history.

(56) References Cited

U.S. PATENT DOCUMENTS

| | | | | |
|---|---|---|---|---|
| 8,326,327 | B2 * | 12/2012 | Hymel et al. ............... | 455/456.3 |
| 2007/0282621 | A1 * | 12/2007 | Altman et al. .................... | 705/1 |
| 2008/0004043 | A1 * | 1/2008 | Wilson et al. ............... | 455/456.3 |
| 2008/0215524 | A1 * | 9/2008 | Fuchs et al. ........................ | 707/1 |
| 2008/0288545 | A1 * | 11/2008 | Hegedus et al. ............ | 707/104.1 |
| 2009/0089417 | A1 * | 4/2009 | Giffin et al. .................... | 709/224 |
| 2009/0241040 | A1 * | 9/2009 | Mattila et al. .................. | 715/760 |
| 2012/0096401 | A1 * | 4/2012 | Mercer et al. .................. | 715/810 |
| 2012/0254804 | A1 * | 10/2012 | Sheha et al. ................... | 715/834 |
| 2013/0073388 | A1 * | 3/2013 | Heath .......................... | 705/14.53 |

OTHER PUBLICATIONS

Kazufumi Watanabe (Jasmine: A real-time local-event detection system based on geolocation information propagated to microblogs), Oct. 24-28, 2011.*
International Search Report and Written Opinion for PCT/EP2012/074068 dated Mar. 1, 2013, pp. 1-11.
T. M. Nguyen, et al., "Building Earthquake Semantic Network by Mining Human Activity from Twitter," 2011 IEEE International Conference on Granular Computing (GRC), Nov. 8, 2011, pp. 496-501.
K. Watanabe, et al., "Jasmine: A Real-Time Local-Event Detection System Based on Geolocation Information Propagated to Microblogs," 2011 Association of Computing Machinery, Conference on Information and Knowledge Management (ACM CIKM), Oct. 28, 2011, pp. 2541-2544.

* cited by examiner

*Primary Examiner* — Khai M Nguyen
(74) *Attorney, Agent, or Firm* — Ditthavong & Steiner, P.C.

(57) ABSTRACT

An approach is provided for generating accurate and substantially real-time map and location-based data in a cost-effective manner. Specifically, one or more communications within one or more social networks are monitored, processed, and mined to determine map-related information (e.g., maps, traffic, points of interest). The map-related information is then subjected to one or more threshold criteria (e.g., a correctness probability, a level of confidence, a degree of trust, an author's influence, a rating, or a combination thereof) to better ensure its accuracy before being made available to mapping and/or location-based services that can use the map-related information to develop better quality maps and/or location-based mobile applications (e.g., improved routing guidance, location recommendations, etc.). By providing mapping and location-based services with accurate and real-time map and location-based data, the services can fulfill user's increasing expectation and demand for up-to-the-minute information.

20 Claims, 8 Drawing Sheets

METHOD AND APPARATUS FOR GENERATING REAL-TIME MAP AND LOCATION-BASED DATA

BACKGROUND

Service providers and device manufacturers (e.g., wireless, cellular, etc.) are continually challenged to deliver value and convenience to consumers by, for example, providing compelling network services. One area of interest has been the creation and maintenance of mapping and location-based services for mobile device users, particularly services that respond to users' increasing expectation and demand for up-to-the-minute information. More specifically, there is an interest in providing users with substantially real-time information feeds about traffic, road construction, new road development, and point of interest (POI) changes. However, traditional geospatial data collection approaches are costly and restricted by nature and newly developed crowd sourcing methods require intentional and devoted activity from vast numbers of honest individuals. Accordingly, service providers and device manufacturers face significant technical challenges to generating accurate and substantially real-time geospatial data in a cost-effective manner.

SOME EXAMPLE EMBODIMENTS

Therefore, there is a need for an approach for generating accurate and substantially real-time map and location-based data in a cost-effective manner.

According to one embodiment, a method comprises causing, at least in part, a monitoring of one or more communications exchanged within one or more social networks. The method also comprises processing and/or facilitating a processing of the one or more communications to determine map-related information. The method further comprises determining to make the map-related information available to one or more mapping services, one or more location-based services, or a combination thereof According to another embodiment, an apparatus comprises at least one processor, and at least one memory including computer program code for one or more computer programs, the at least one memory and the computer program code configured to, with the at least one processor, cause, at least in part, the apparatus to cause, at least in part, a monitoring of one or more communications exchanged within one or more social networks. The apparatus is also caused to process and/or facilitate a processing of the one or more communications to determine map-related information. The apparatus is further caused to determine to make the map-related information available to one or more mapping services, one or more location-based services, or a combination thereof.

According to another embodiment, a computer-readable storage medium carries one or more sequences of one or more instructions which, when executed by one or more processors, cause, at least in part, an apparatus to cause, at least in part, a monitoring of one or more communications exchanged within one or more social networks. The apparatus is also caused to process and/or facilitate a processing of the one or more communications to determine map-related information. The apparatus is further caused to determine to make the map-related information available to one or more mapping services, one or more location-based services, or a combination thereof.

According to another embodiment, an apparatus comprises means for causing, at least in part, a monitoring of one or more communications exchanged within one or more social networks. The apparatus also comprises means for processing and/or facilitating a processing of the one or more communications to determine map-related information. The apparatus further comprises means for determining to make the map-related information available to one or more mapping services, one or more location-based services, or a combination thereof In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for generating accurate and substantially real-time map and location-based data in a cost-effective manner are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term social maps data refers to map-related information and/or data found within one or more communications exchanged within one or more social networks.

Figure 1:
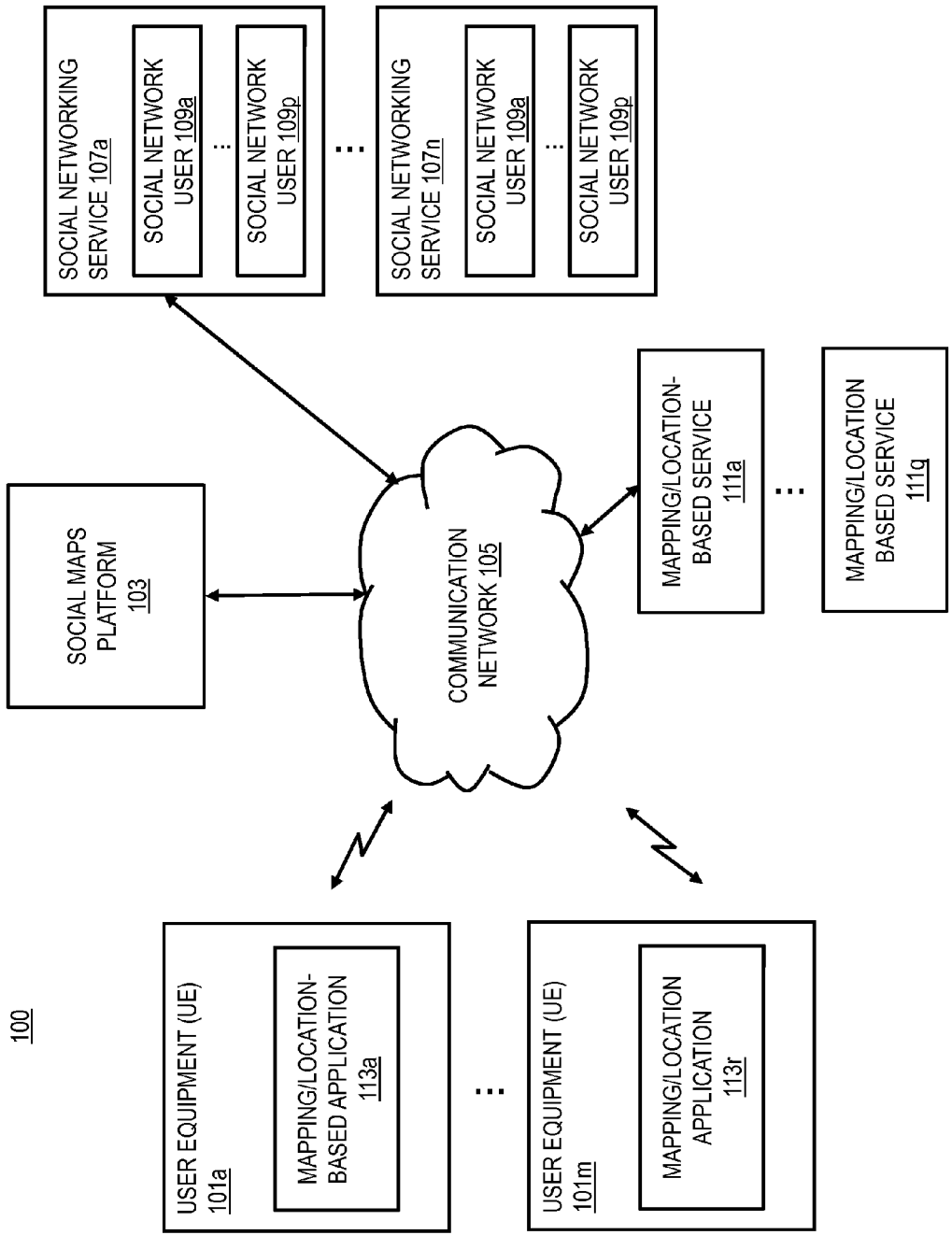
FIG. 1 is a diagram of a system capable of generating accurate and substantially real-time map and location-based data in a cost-effective manner, according to one embodiment.

FIG. 1 is a diagram of a system capable of generating accurate and substantially real-time map and location-based data in a cost-effective manner, according to one embodiment. As previously discussed, service providers and devices manufactures are interested in developing and improving mapping and location-based services for mobile device users, particularly services that respond to users' increasing want and demand for up-to-the-minute information. However, the creation and maintenance of mapping and location-based services (e.g., navigation, POI, search, driving and walking recommendations) requires collecting and processing vast amounts of data, which is not freely available and not always accurate. More specifically, there is an interest in providing users with substantially real-time information feeds about traffic, road construction, new road development, and POI changes. Traditional geospatial data collection approaches have included gathering data from driving roads with specially constructed vehicles, municipality and local reporting, satellite imagery, probes, and POI providers. These methods, however, are often costly and restricted by their nature. For example, the traffic data supplied by the municipality or local reporting may no longer be valid after a short period of time. Another emerging source of geospatial information is crowd sourcing (e.g., communities of people that report about defects and updates for maps and POIs). However, accurate crowd sourcing requires substantial intentional and devoted activity on the part of the crowd or community, which can probably only be expected from a small portion of the population. In addition, the information derived from crowd sourcing also has the potential to become invalid in a short period of time. Further, the reliability of the information derived from crowd sourcing can be suspect when the community is aware that their information is being actively collected. Therefore, a convenient approach to generating accurate and substantially real-time map and location-based data in a cost-effective manner is desired.

To address this problem, a system 100 of FIG. 1 introduces the capability to generate accurate and substantially real-time map and location-based data in a cost-effective manner. More specifically, the system 100 monitors communications exchanged within one or more social networks (e.g., FACEBOOK, TWITTER, YOUTUBE, etc.) to determine substantially real-time map and location-based information that can be processed, mined, and made available to mapping and location-based services in order to develop better quality maps and location-based applications and/or services (e.g., improved routing guidance, location-based recommendations, etc.).

Research suggests that the number of users and the time spent exchanging communications within one or more social networks has already reached the volume of email communication and probably will be surpassing it in the near future. As a result, the communications exchanged within one or more social networks can provide a fertile ground for information processing (e.g., collection, extraction, storage, and analysis) and data mining (i.e., automatic or semi-automatic analysis of large quantities of data to extract previously unknown interesting patterns). In essence, the system 100 re-purposes commercially available tools developed for monitoring and analyzing various social networks for marketing, promotions, and customer services purposes in order to generate geospatial and location-based data (also collectively referred to as social map data). As a result, the system 100 involves the majority of the population as opposed to a particular crowd or community in generating the social map data. As already mentioned, by passively collecting the map-related information without the community knowing, the system 100 avoids the disadvantages often associated with information provided by individuals and/or communities that are aware that they are being tasked with providing such information. In one example, the initial selection and filtering of the map-related information by the system 100 is based on a linguistic analysis of the information (e.g., map, traffic, POI, location-based or location related keywords and phrases). After the map-related information is collected and stored, the system 100 mines the information to determine social map data based, at least in part, on pattern recognition. For example, the system 100 correlates the map-related information from among one or more social networks, binds the map-related information to one or more map elements, filters the map-related information, based at least in part, on one or more noise filters, classifies the map-related information based, at least in part, on the granularity of the data, or a combination thereof. Further, the system 100 also subjects the extracted data to a number of threshold criteria to better ensure its accuracy including a correctness probability, a level of confidence, a degree of trust, an author's influence, a rating, or a combination thereof before the social map data is propagated to one or more mapping and/or location-based services. In one embodiment, the resulting map-related information or social map data is propagated to mapping and/or location-based services that in turn make the social map data available to users of mobile devices (e.g., mobile phones) through one or more mobile mapping/location-based applications.

As shown in FIG. 1, the system 100 comprises one or more user equipment (UE) 101a-101m (also collectively referred to as UEs 101) having connectivity to a social maps platform 103, one or more social network services 107a-107n (also collectively referred to as social network services 107) consisting of one or more social network users 109a-109p (also collectively referred to as social network users 109), and one or more mapping and/or location-based services 111a-111q (also collectively referred to as mapping/location services 111) via a communication network 105. In one embodiment, the UEs 101 contain one or more mapping/location-based applications 113a-113r (also collectively referred to as mapping/location-based applications 113). The mapping/location-based applications 113 enable the UEs 101 to access the social map data determined by the system 100 and subsequently provisioned by the mapping/location services 111. The social maps platform 103 may exist independently or within a cloud computing and/or cloud storage platform. Further, in one example, a social network user 109 may use a UE 101 in order to both communicate map-related information within the social network services 107 as well as receive the generated social map data provided by the mapping/location based services 111.

In one example, the system 100 determines one or more communications being exchanged within the social network services 107 regarding weather and in particular the occurrence of heavy rain and/or thunderstorms that could potentially make driving conditions hazardous. The system 100 first processes the one or more communications based on a linguistic analysis of the data (e.g., map, traffic, POI, location-based or location related keywords and phrases) to determine map-related information. The system 100 then mines the map-related information to determine patterns (e.g., the storm is moving north along the east coast of the United States). In addition to determining that the storm is moving north, the system 100 may also determine how social network users 109 are altering their travel patterns (e.g., avoiding heavily congested routes) or making related purchases (e.g., raingear, bottled water, etc.) as a result of the storm. As previously discussed, before the system 100 propagates the social map data to the mapping/location-based services 111, the system 100 subjects the data to one or more threshold criteria including, at least in part, a correctness probability, a level of confidence, a degree of trust, an author's influence, a rating, or a combination thereof to determine the likely accuracy of such data. For example, the system 100 may designate one or more data items as social map data if a substantial number of the social network users 109 are all exchanging the same or similar communication on or about the same time within the social network services 107 (e.g., "it's raining at 1:00 p.m. in Boston"). Further, the system 100 may determine that the information shared in the one or more communications within the social network services 107 between friends and family should receive a greater influence or higher rating than the one or more communications exchanged between strangers. An example of an exception to this determination may be if the strangers comprise a community of meteorologists. Therefore the system 100 should attribute a higher level of confidence, higher degree of trust, stronger author's influence, etc. to these communications exchanged within the social network services 107. Once the system 100 is able to verify the quality of the data by subjecting the data to the various threshold criteria, the system 100 can make the social map data available to mapping/location-based services 111 that can in turn communicate the social map data to the UEs 101 via the communication network 105 and the mapping/location based applications 113. Accordingly, the system 100 is capable of generating accurate and substantially real-time map and location-based data regarding the heavy rain and/or thunderstorms in a cost-effective manner.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 101 are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UEs 101 can support any type of interface to the user (such as "wearable" circuitry, etc.).

By way of example, the UEs 101, the social maps platform 103, the social network services 107, and the mapping/location based services 111 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
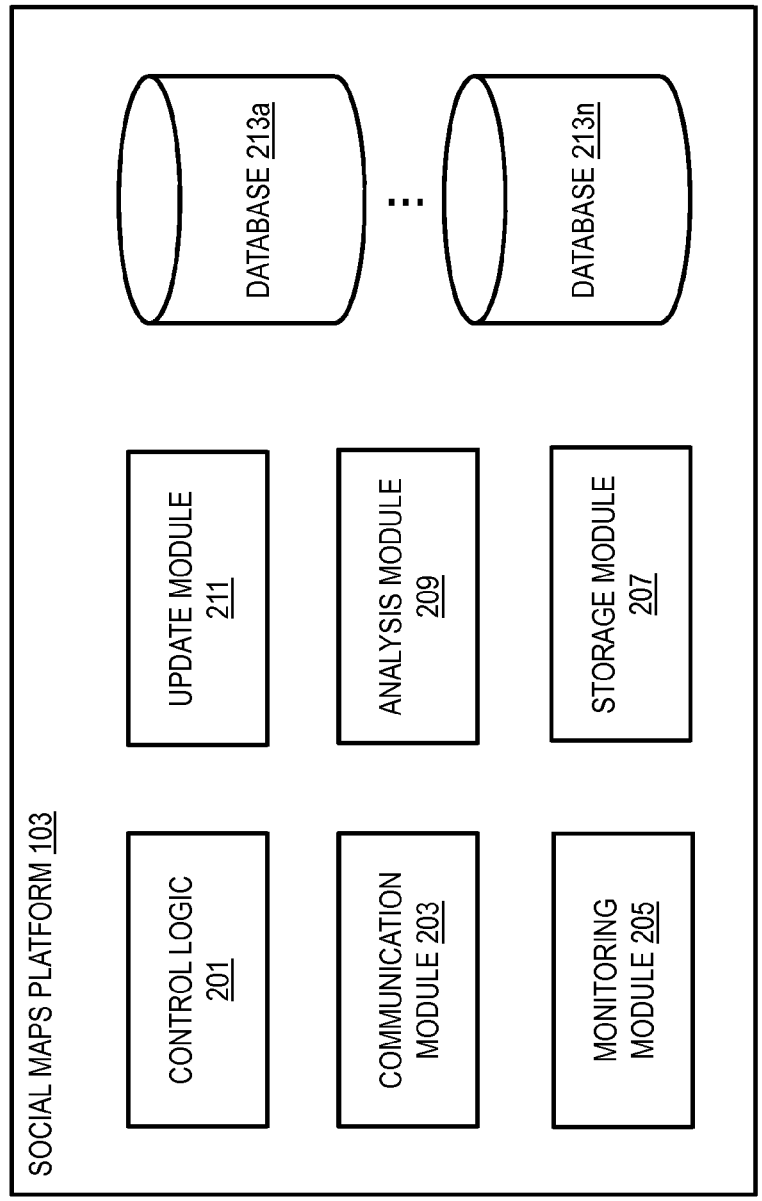
FIG. 2 is a diagram of the components of a social maps platform, according to one embodiment.

FIG. 2 is a diagram of the components of a cloud-based social maps platform 103, according to one embodiment. By way of example, the social maps platform 103 includes one or more components for generating accurate and substantially real-time map and location-based data in a cost-effective manner. It is contemplated that the functions of these components may be combined in one or more components or performed by other components of equivalent functionality. In this embodiment, the social maps platform 103 includes a control logic 201, a communication module 203, a monitoring module 205, a storage module 207, an analysis module 209, an update module 211, and one or more databases 213a-213n (also collectively referred as the databases 213).

The control logic 201 oversees tasks, including tasks performed by the communication module 203, the monitoring module 205, the storage module 207, the analysis module 209, and the update module 211. For example, although the other modules may perform the actual task, the control module may determine when and how those tasks are performed or otherwise direct the other modules to perform the task.

The communication module 203 is used for communication between the social maps platform 103, the social network services 107, and the mapping/location-based services 111. The communication module 203 may be used to communicate commands, requests, data, etc.

The monitoring module 205 comprises one or more commercially available tools developed for monitoring and analyzing various social networks for marketing, promotions, and customer services purposes (e.g., RADIAN6, KANA, VISIBLE, etc.). As previously discussed, the one or more commercially available monitoring and analysis tools are re-purposed to process the one or more communications within the social network services 107 to determine map-related information. More specifically, in one example, the initial selection and filtering of the communications by the monitoring module 205 is based on a linguistic analysis of the data (e.g., map, traffic, POI, location-based and location related keywords and phrases). For example, one or more communications within the social network services 107 related to Boston, I-95, and car accidents may be processed by the monitoring module 205, but one or more communications related to food, sports, and politics may not. An example of an exception to this determination could include one or more communications regarding a professional football game, which could easily affect nearby traffic conditions and commuting times.

The storage module 207 is used to store the map-related information found within the social network services 107 in one or more databases 213a-213n (also collectively referred to as databases 213). The storage module 207 is also used to provide secondary filtering and classification of the map-related information.

The analysis module 209 is used to extract map-related information from the one or more communications determined by the monitoring module 205 from within the social network services 107. More specifically, the analysis module 209 determines patterns among the map-related information by correlating the map-related data, binding the map-related information to one or more map elements, filtering the map-related information, based at least in part, on one or more noise filters, classifying the map-related information based, at least in part, on the granularity of the data, or a combination thereof. Further, the analysis module 209 also subjects the extracted data to a number of threshold criteria stored within the databases 213 including a correctness probability, a level of confidence, a degree of trust, an author's influence, a rating, or a combination thereof. Once the map-related data reaches one or more threshold criteria, the data is considered accurate and valid and can then be propagated to the mapping/location-based services 111 by the communication module 203.

The update module 211 may work with the monitoring module 205, the storage module 207, and the analysis module 209 to cause, at least in part, an initiation of the determination of the monitoring of the one or more communications, the processing of the one or more communications, the determination of the map-related information, or a combination thereof in substantially real-time, periodically, according to a schedule, on demand, or a combination thereof.

Figure 3:
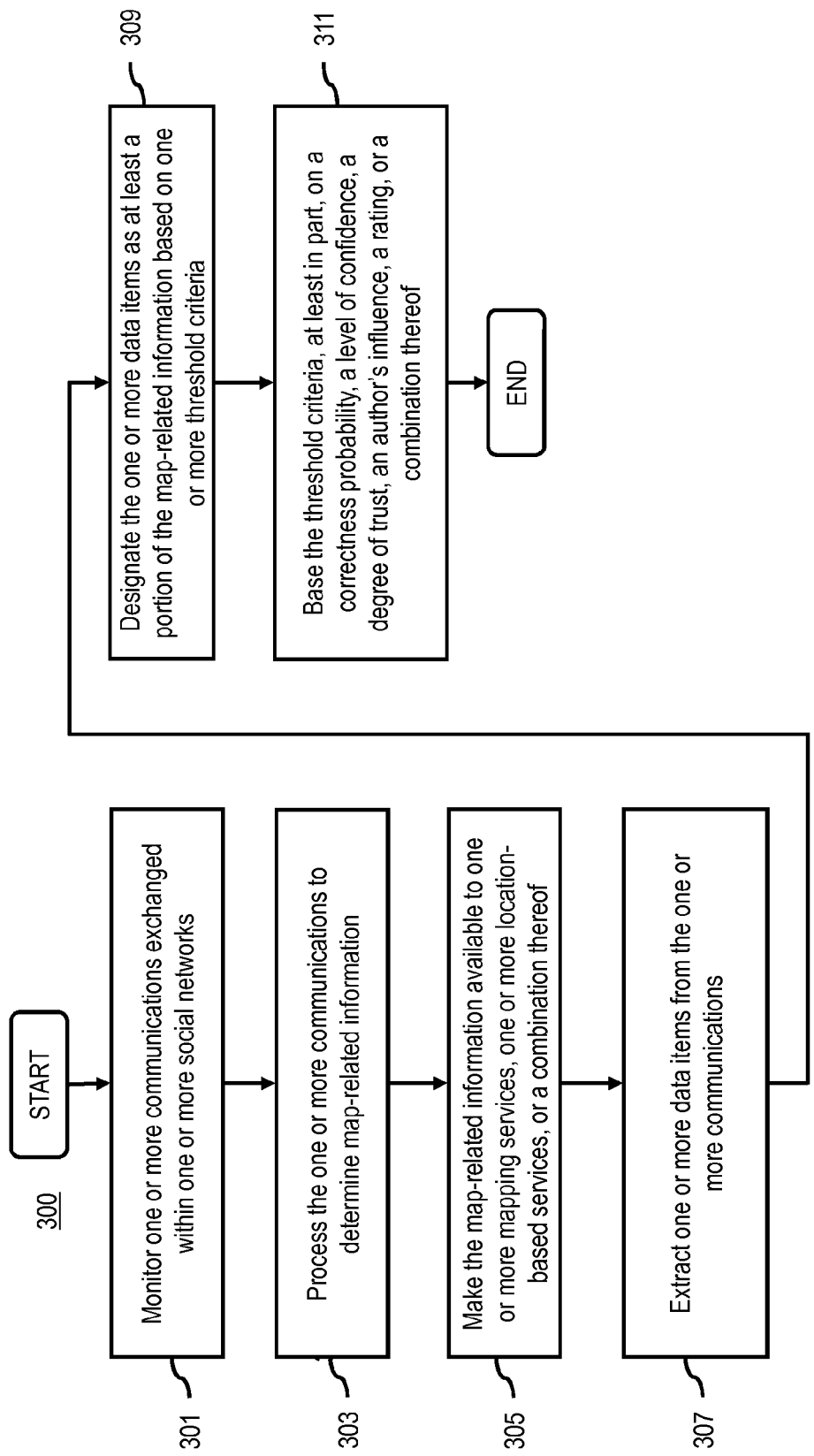
FIGS. 3 and 4 are flowcharts of processes for generating accurate and substantially real-time map and location-based data in a cost-effective manner, according to one embodiment.
Figure 4:
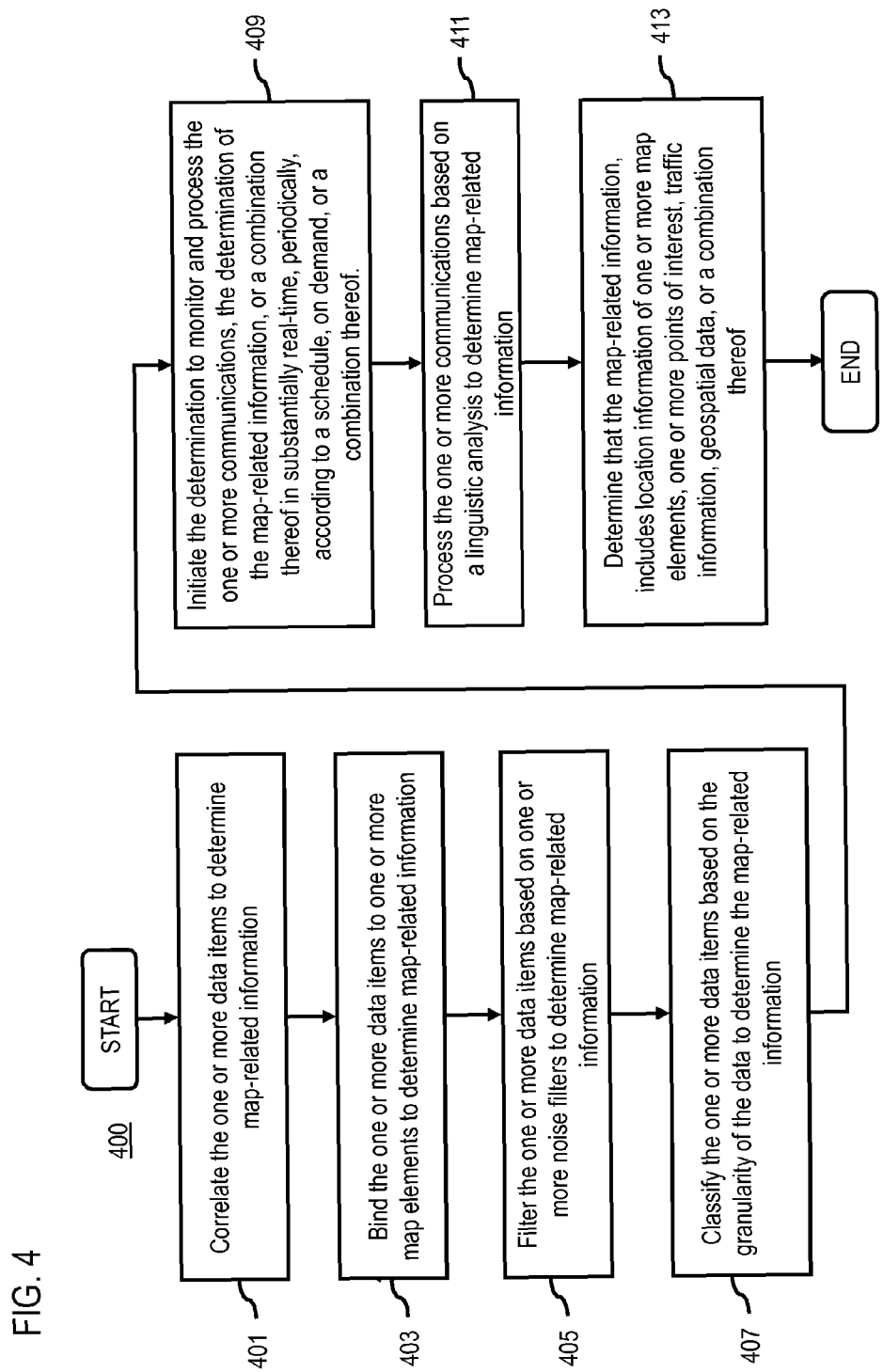
Figure 7:
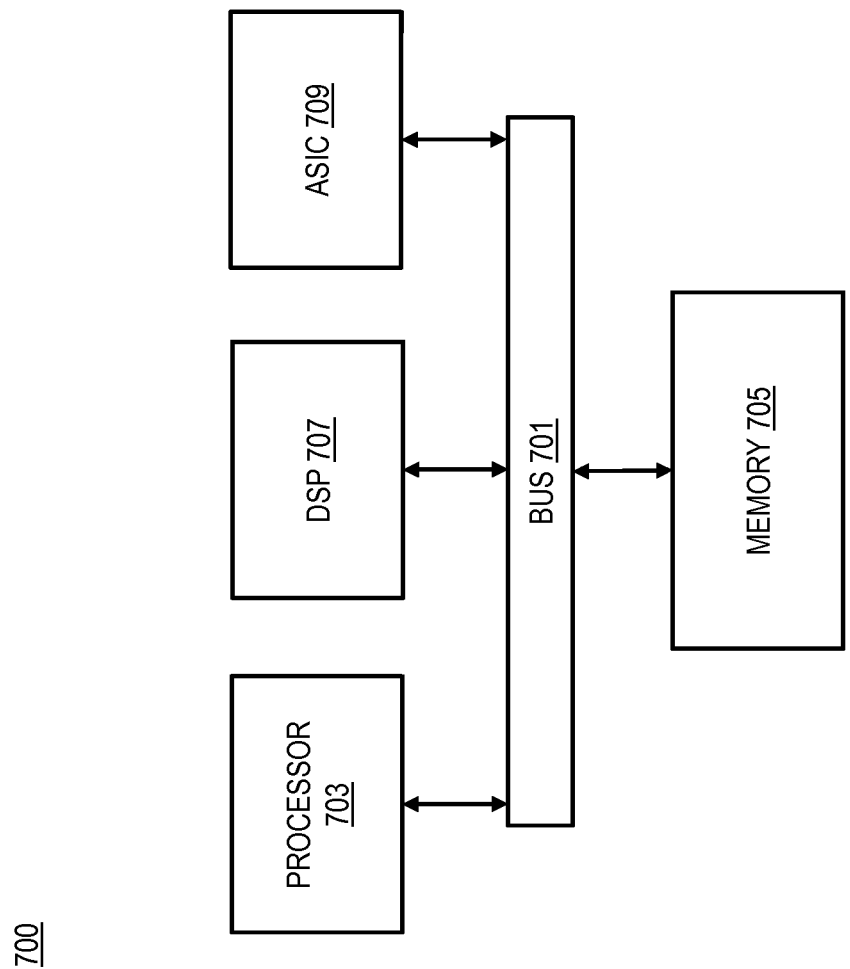
FIG. 7 is a diagram of a chip set that can be used to implement an embodiment of the invention.

FIGS. 3 and 4 are flowcharts of processes for generating accurate and substantially real-time map and location-based data in a cost-effective manner, according to one embodiment. FIG. 3 depicts a process 300 of monitoring, processing, and making available to one or more mapping and/or location-based services map-related information. In one embodiment, the social maps platform 103 performs the process 300 and is implemented in, for instance, a chip set including a processor and a memory as shown in FIG. 7. In step 301, the social maps platform 103 causes, at least in part, a monitoring of one or more communications exchanged within one or more social networks. For example, the communications can include any communications created by one or more social network users for the purpose of exchanging user generated content (e.g., posts, blogs, comments, etc.) within the various social networks (e.g., FACEBOOK, TWITTER, YOUTUBE, etc.).

In step 303, the social maps platform 103 processes and/or facilitates a processing of the one or more communications to determine map-related information. As previously discussed, the social maps platform 103 processes the one or more communications by utilizing one or more commercially available tools developed for monitoring and analyzing various social networks for marketing, promotions, and customer services purposes. More specifically, in one example, the initial selection and filtering of the communications by social maps platform 103 is based on a linguistic analysis of the communications (e.g., keywords and phrases) to determine the map-related information. For example, communications containing keywords and phrases related to a point of interest, a route, or a traffic disturbance may be processed by the social maps platform 103, but keywords and phrases related to food, sports, and politics may not. As previously discussed, one example of an exception to this determination would include an event related to food, sports, or politics that could affect nearby map-related information (e.g., traffic) and therefore should also be processed by the social maps platform 103.

In step 305, the social map platform 103 determines to make the map-related information available to one or more mapping services, one or more location-based services, or a combination thereof. As previously discussed, the social map platform 103 makes the map-related information or social map data available to mapping and/or location-based services once the social maps platform 103 determines that the map-related data reaches one or more pre-defined threshold criteria. The mapping and/or location-based services can then leverage the map-related data to improve map and/or location-based services and more importantly provide end-users with substantially real-time map and/or location-based information (e.g., routing changes, location based recommendations, etc.). For example, a mapping service can make map-related information generated by the social maps platform 103 available to one or more mobile devices (e.g., mobile phones) through one or more mobile mapping mobile applications.

In step 307, the social map platform 103 causes, at least in part, an extraction of one or more data items from one or more communications. As previously discussed, in one example, the initial selection and filtering of the communications by the social maps platform 103 is based on a linguistic analysis of the communications (e.g., keywords and phrases) to determine the map-related information. For example, communications containing keywords and phrases related to map coordinates, traffic conditions, points of interest, location-based information may be processed by the social maps platform 103. More specifically, if the social maps platform 103 determined that a number of the one or more communications within the one or more social networks contained keywords related to a rainstorm, the one or more data items relating to the rainstorm would be extracted for processing by the social maps platform 103.

In step 309, the social map platform 103 causes, at least in part, a designation of the one or more data items as at least a portion of the map-related information based, at least in part, on one or more threshold criteria. For example, map-related information could include information related to maps, traffic, points of interest, location-based information, etc. More specifically, the map-related information could also relate to road construction, new road development, and POI changes.

In step 311, the social maps platform 103 designates the one or more data items as at least a portion of the map-related information based, at least in part, on one or more threshold criteria, wherein the one or more threshold criteria include at least in part, a correctness probability, a level of confidence, a degree of trust, an author's influence, a rating, or a combination thereof of the one or more data items, the one or more communications, the one or more social networks, or a combination thereof. Implementation of various threshold criteria by the social maps platform 103 improves the accuracy of the generated map-related data and reduces the pitfalls often associated with crowd sourcing data. As previously discussed, the social maps platform 103 may designate one or more data items as map-related information if a substantial number of the social network users are all exchanging the same or similar communication on or about the same time within the one or more social network services (e.g., it's raining at 1:00 p.m. in Boston). Also, the social maps platform 103 may determine that the map-related information shared in the one or more communications within the one or more social network services between friends and family should receive a greater influence or higher rating than the one or more communications exchanged between strangers. As previously discussed, an example of an exception to this determination may be if the strangers comprise a community of meteorologists.

FIG. 4 depicts a process 400 of processing and/or data mining the one or more communications exchanged within the one or more social networks to determine accurate and substantially real-time map-related information. In one embodiment, the social maps platform 103 performs the process 400 and is implemented in, for instance, a chip set including a processor and a memory as shown in FIG. 7. In step 401, the social maps platform 103 causes, at least in part, a correlation of the one or more data items among different ones of the one or more communications, the one or more social networks, or a combination thereof, wherein the determination of the map-related information is based, at least in part, on the correlation. For example, the social maps platform 103 can correlate one or more communications regarding traffic speed on a major route (e.g., "stuck in traffic on Route 101") and current weather conditions (e.g., "it's raining") to determine the relation, if any, between the two communications. If the social maps platform 103 determines that the relationship between the two communications meets a certain threshold criteria (e.g., it's raining on Route 101), then the social maps platform 103 can further process those communications as map-related information.

In step 403, the social maps platform 103 causes, at least in part, a binding of the one or more data items to one or more map elements, wherein the determination of the map-related information is based, at least in part, on the binding. Binding of the one or more data items to one or more map elements increases the speed by which the social maps platform 103 is able to make future determinations regarding map-related information. For example, the social map platform 103 can bind a particular restaurant (e.g., Joe Smith's Steakhouse) with a particular route (e.g., Route 101) to later determine that traffic disruptions around Joe Smith's Steakhouse are likely to affect traffic conditions on portions of Route 101 and that traffic disruptions on Route 101 may affect traffic conditions around Joe Smith's Steakhouse. In this instance, after the social maps platform 103 propagates the map-related information to one or more mapping/location-based services, the one or more services may alert end-users through one or more mobile mapping/location-based applications that there is a traffic disturbance and/or recommend alternative travel routes.

In step 405, the social maps platform 103 causes, at least in part, a filtering of the one or more data items based, at least in part, on one or more noise filters, wherein the determination of the map-related information is based, at least in part, on the filtering. Noise filtering is the process by which inutile, unwanted, and irrelevant communications can be removed, reduced, or even blocked from further processing by the social maps platform 103. For example, if the social maps platform 103 determines that a particular communication stream within the one or more social networks regarding Route 101 rarely contains map-related information, but instead contains political rants about government policy under the pretext of discussing Route 101, the social maps platform 103 can filter out this stream of communication for further processing.

In step 407, the social maps platform 103 causes, at least in part, a classification of the one or more data items based, at least in part, on the granularity of the data, wherein the determination of the map-related information is based, at least in part, on the classification. For example, the social maps platform 103 can determine to classify the one or more data items based on a fine-granularity (i.e., small specific parts). More specifically, the social maps platform 103 can determine information regarding a particular route (e.g., Route 101) based on cities and states as opposed to the entire route so that the social maps platform 103 is quickly able to determine that communications within one or more social networks concerning the start of Route 101 in Los Angeles, Calif. are unlikely to be relevant to communications within one or more social networks concerning the other end of Route 101 in Raymond, Wash. As previously discussed, the classification of the data items is important for improving the accuracy of the map-related information propagated to the one or more mapping/location-based services.

In step 409, the social maps platform 103 causes, at least in part, an initiation of the determination of the monitoring of the one or more communications, the processing of the one or more communications, the determination of the map-related information, or a combination thereof in substantially real-time, periodically, according to a schedule, on demand, or a combination thereof.

In step 411, the social maps platform 103 processes and/or facilitates a processing of the one or more communications based, at least in part, on a linguistic analysis to determine the map-related information. As previously discussed, in one example, the social maps platform 103 initially selects and filters the one or more communications within the one or more social network services based on keywords and phrases related to maps, traffic, POI, locations, etc. to determine the map-related information.

In step 413, the social maps platform 103 processes and/or facilitates a processing of the one or more communication to determine map-related information, wherein the map-related information includes, at least in part, location information of one or more map element, one or more points of interest, traffic information, geospatial data, or a combination thereof. The determination and subsequent propagation of location information by social maps platform 103 enables mapping/location-based services to build better maps and provide better location-based services, which are increasingly desired and demanded by end-users.

Figure 5:
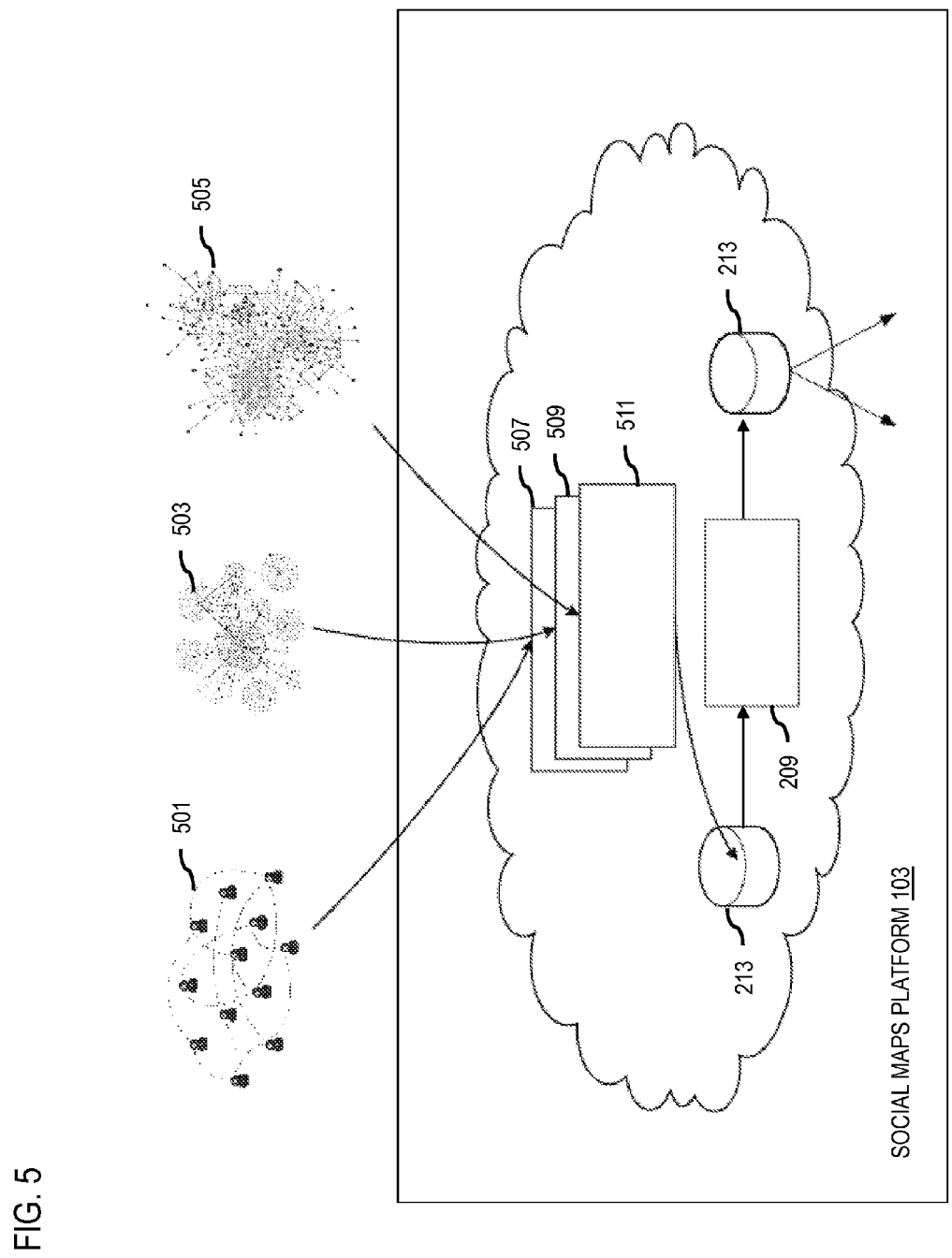
FIG. 5 is a diagram of an example data flow as utilized in the processes of FIGS. 3 and 4, according to various embodiments.

FIG. 5 is a diagram of an example data flow utilized in the processes of FIGS. 3 and 4. As shown, FIG. 5 illustrates an embodiment of the data flow of one or more data items from one or more communications exchanged within one or more social networks (e.g., social networks 501, 503, and 505). For example, one or more communications are initially selected and processed by one or more social network monitoring and analysis tools (e.g., social network monitoring and analysis tools 507, 509, and 511) to determine map-related information. The selected communications are then stored in the databases 213, where they are further filtered and classified. Thereafter, the analysis module 209 extracts, processes, and mines the stored communications to determine map-related information. In addition, the analysis module 209 subjects the map-related information to a number of threshold criteria to better ensure its accuracy before again storing the map-related information in the databases 213. Once the social maps platform 103 determines the accuracy of the map-related information it can then propagate the information to one or more mapping/location-based services.

The processes described herein for generating accurate and substantially real-time map and location-based data in a cost-effective manner may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
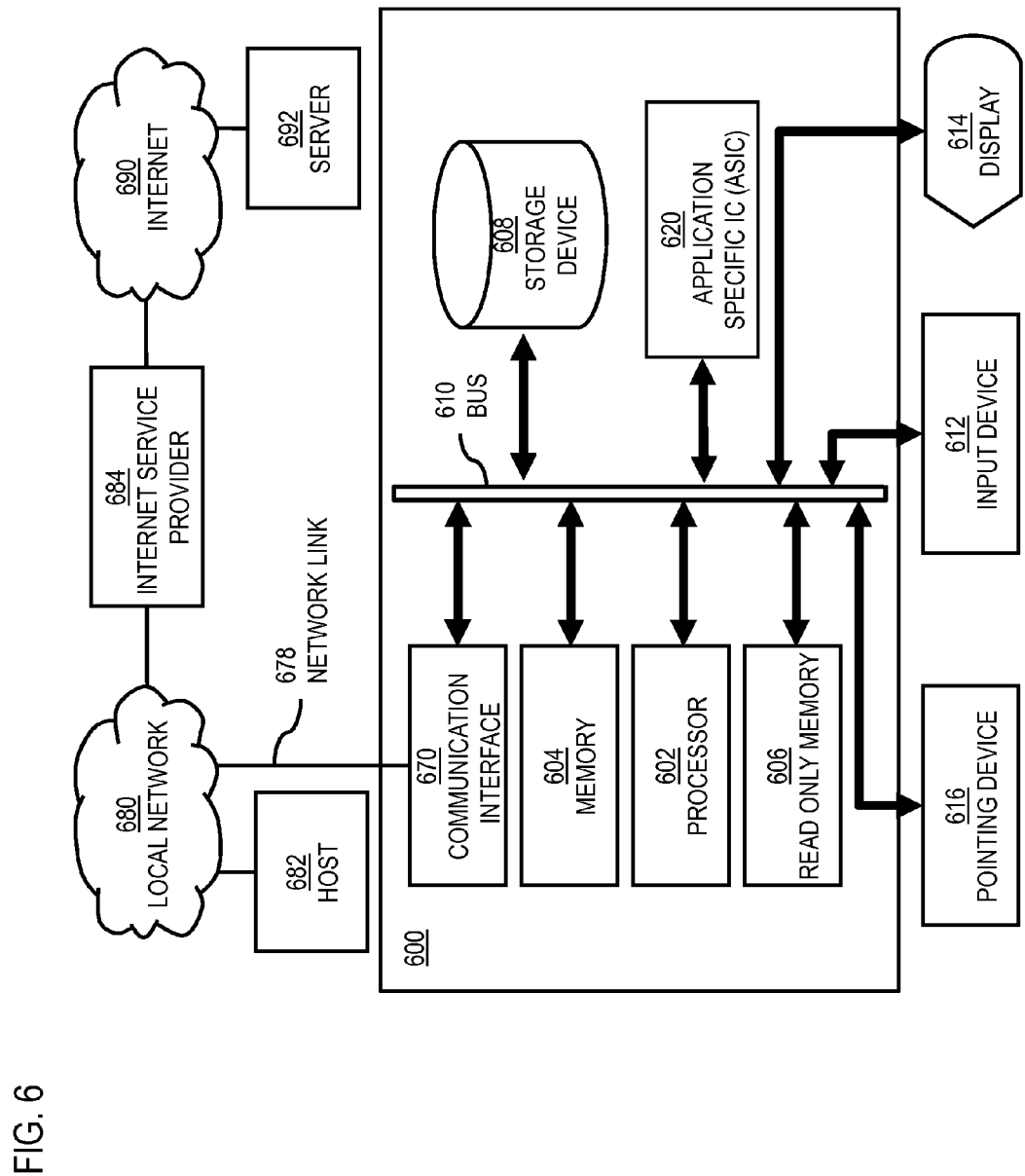
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to generate accurate and substantially real-time map and location-based data in a cost-effective manner as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of generating accurate and substantially real-time map and location-based data in a cost-effective manner.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to generate accurate and substantially real-time map and location-based data in a cost-effective manner. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for generating accurate and substantially real-time map and location-based data in a cost-effective manner. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for generating accurate and substantially real-time map and location-based data in a cost-effective manner, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for generating accurate and substantially real-time map and location-based data in a cost-effective manner to the UEs 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to generate accurate and substantially real-time map and location-based data in a cost-effective manner as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of generating accurate and substantially real-time map and location-based data in a cost-effective manner.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to generate accurate and substantially real-time map and location-based data in a cost-effective manner. The memory 705 also stores the data associated with or generated by the execution of the inventive steps.

Figure 8:
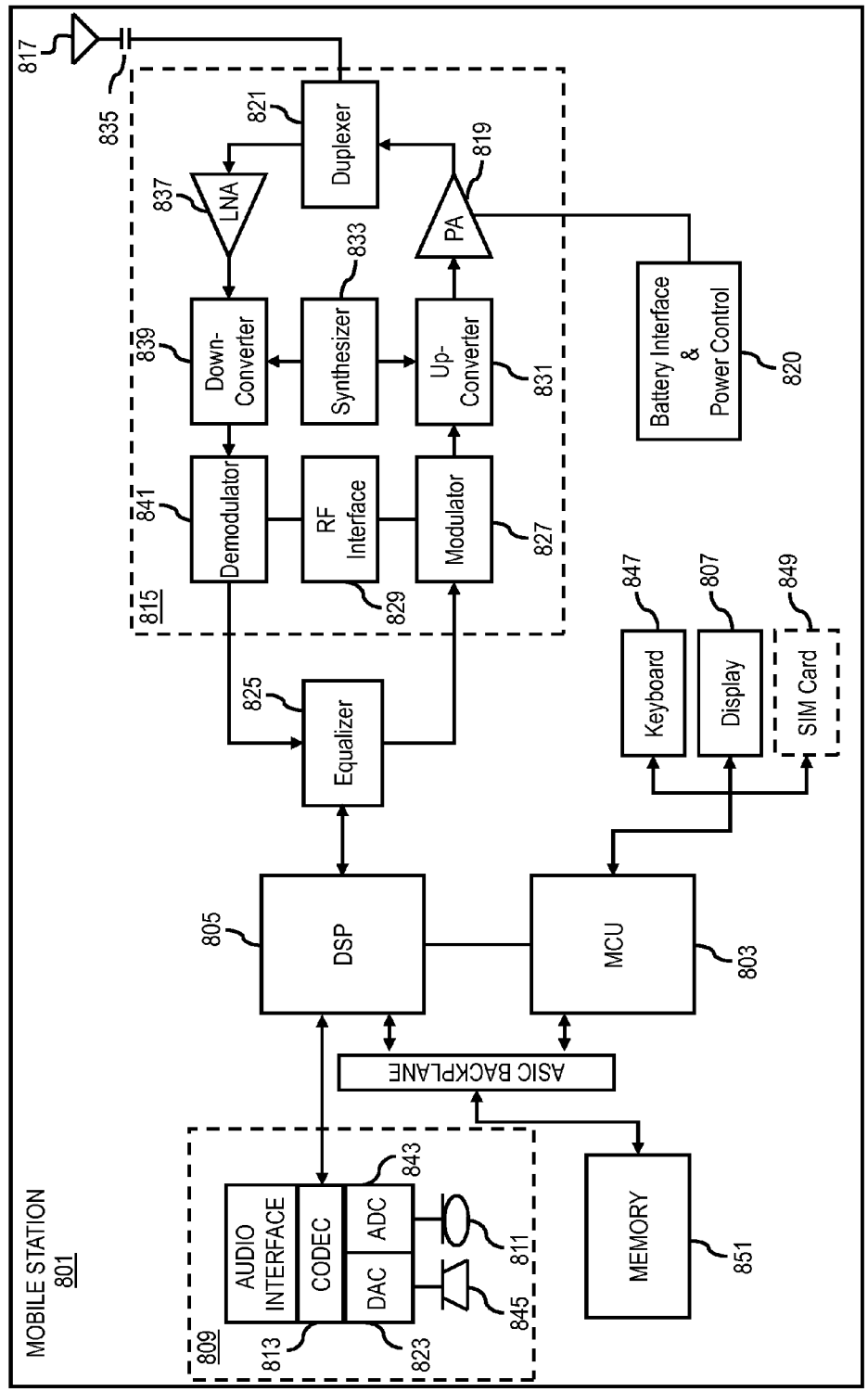
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of generating accurate and substantially real-time map and location-based data in a cost-effective manner. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of generating accurate and substantially real-time map and location-based data in a cost-effective manner. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to generate accurate and substantially real-time map and location-based data in a cost-effective manner. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    a monitoring of one or more communications exchanged within one or more social networks;
    a processing of user generated content within the one or more communications to determine map-related information;
    an extraction of one or more data items from the one or more communications;
    a designation of the one or more data items as at least a portion of the map-related information based, at least in part, on one or more threshold criteria;
    a processing of the map-related information to determine pattern information based, at least in part, on one or more detected changes in the map-related information; and
    at least one determination to make the map-related information and the pattern information available to one or more mapping services, one or more location-based services, or a combination thereof.

2. A method of claim 1, wherein the one or more threshold criteria include, at least in part, a correctness probability, a level of confidence, a degree of trust, an author's influence, a rating, or a combination thereof of the one or more data items, the one or more communications, the one or more social networks, or a combination thereof.

3. A method of claim 1, wherein the (1) data and/or (2) information and/or (3) at least one signal are further based, at least in part, on the following:
    a correlation of the one or more data items from among different ones of the one or more communications, the one or more social networks, or a combination thereof,
    wherein the determination of the map-related information is based, at least in part, on the correlation.

4. A method of claim 1, wherein the (1) data and/or (2) information and/or (3) at least one signal are further based, at least in part, on the following:
    a binding of the one or more data items to one or more map elements,
    wherein the determination of the map-related information is based, at least in part, on the binding.

5. A method of claim 1, wherein the (1) data and/or (2) information and/or (3) at least one signal are further based, at least in part, on the following:
    a filtering of the one or more data items based, at least in part, on one or more noise filters,
    wherein the determination of the map-related information is based, at least in part, on the filtering.

6. A method of claim 1, wherein the (1) data and/or (2) information and/or (3) at least one signal are further based, at least in part, on the following:
    a classification of the one or more data items based, at least in part, on the granularity of the data,
    wherein the determination of the map-related information is based, at least in part, on the classification.

7. A method of claim 1, wherein the (1) data and/or (2) information and/or (3) at least one signal are further based, at least in part, on the following:
    an initiation of the determination of the monitoring of the one or more communications, the processing of the one or more communications, the determination of the map-related information, or a combination thereof in substantially real-time, periodically, according to a schedule, on demand, or a combination thereof.

8. A method of claim 1, wherein the (1) data and/or (2) information and/or (3) at least one signal are further based, at least in part, on the following:
    a processing of the one or more communications based, at least in part, on a linguistic analysis of the user generated content to determine the map-related information.

9. A method of claim 1, wherein the map-related information includes, at least in part, location information of one or more map elements, one or more points of interest, traffic information, geospatial data, or a combination thereof.

10. A method of claim 1, further comprising:
    a processing of the user-generated content to determine an altered user behavior based, at least in part, on a response to the map-related information.

11. An apparatus comprising:
    at least one processor; and
    at least one memory including computer program code for one or more programs,
    the at least one memory and the computer program code configured to, with the at least one processor, cause the apparatus to perform at least the following,
    cause, at least in part, a monitoring of one or more communications exchanged within one or more social networks,
    process and/or facilitate a processing of user generated content within the one or more communications to determine map-related information,
    cause, at least in part, an extraction of one or more data items from the one or more communications,
    cause, at least in part, a designation of the one or more data items as at least a portion of the map-related information based, at least in part, on one or more threshold criteria,
    process the map-related information to determine pattern information based, at least in part, on one or more detected changes in the map-related information, and
    determine to make the map-related information and the pattern information available to one or more mapping services, one or more location-based services, or a combination thereof.

12. An apparatus of claim 11, wherein the one or more threshold criteria include, at least in part, a correctness probability, a level of confidence, a degree of trust, an author's influence, a rating, or a combination thereof of the one or more data items, the one or more communications, the one or more social networks, or a combination thereof.

13. An apparatus of claim 11, wherein the apparatus is further caused to:

cause, at least in part, a correlation of the one or more data items from among different ones of the one or more communications, the one or more social networks, or a combination thereof, wherein the determination of the map-related information is based, at least in part, on the correlation.

14. An apparatus of claim 11, wherein the apparatus is further caused to:

cause, at least in part, a binding of the one or more data items to one or more map elements, wherein the determination of the map-related information is based, at least in part, on the binding.

15. An apparatus of claim 11, wherein the apparatus is further caused to:

cause, at least in part, a filtering of the one or more data items based, at least in part, on one or more noise filters, wherein the determination of the map-related information is based, at least in part, on the filtering.

16. An apparatus of claim 11, wherein the apparatus is further caused to:

cause, at least in part, a classification of the one or more data items based, at least in part, on the granularity of the data, wherein the determination of the map-related information is based, at least in part, on the classification.

17. An apparatus of claim 11, wherein the apparatus is further caused to:

cause, at least in part, an initiation of the determination of the monitoring of the one or more communications, the processing of the one or more communications, the determination of the map-related information, or a combination thereof in substantially real-time, periodically, according to a schedule, on demand, or a combination thereof.

18. An apparatus of claim 11, wherein the apparatus is further caused to:

process and/or facilitate of a processing of the one or more communications based, at least in part, on a linguistic analysis of the user generated content to determine the map-related information.

19. An apparatus of claim 11, wherein the map-related information includes, at least in part, location information of one or more map elements, one or more points of interest, traffic information, geospatial data, or a combination thereof.

20. An apparatus of claim 11, wherein the apparatus is further caused to:

process and/or facilitate a processing of the user-generated content to determine an altered user behavior based, at least in part, on a response to the map-related information.

* * * * *